(12) United States Patent
Ashok et al.

(10) Patent No.: US 7,464,118 B2
(45) Date of Patent: Dec. 9, 2008

(54) ALGORITHM FOR MAXIMIZING APPLICATION AVAILABILITY DURING AUTOMATED ENTERPRISE DEPLOYMENTS

(75) Inventors: Rohith Kottamangalam Ashok, Apex, NC (US); Charles James Redlin, Rochester, MN (US); Barry Charles Searle, Mississauga (CA); Christopher Paul Vignola, Port Jervis, NY (US); Leigh Allen Williamson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 11/003,593

(22) Filed: Dec. 3, 2004

(65) Prior Publication Data

US 2006/0123018 A1    Jun. 8, 2006

(51) Int. Cl.
*G06F 17/30* (2006.01)
(52) U.S. Cl. .................... 707/202; 707/203; 707/204
(58) Field of Classification Search .............. None
See application file for complete search history.

(56) References Cited

U.S. PATENT DOCUMENTS

| | | | |
|---|---|---|---|
| 6,779,177 B1 | 8/2004 | Bahrs et al. ............. 717/173 |
| 2002/0083343 A1 * | 6/2002 | Crosbie et al. ............. 713/201 |
| 2002/0087693 A1 * | 7/2002 | Marshall et al. ............. 709/226 |
| 2003/0046682 A1 | 3/2003 | Crespo et al. ............. 717/178 |
| 2003/0093252 A1 * | 5/2003 | Frankel et al. ............. 703/13 |
| 2003/0101367 A1 * | 5/2003 | Bartfai et al. ............. 714/4 |
| 2004/0225677 A1 | 11/2004 | Rangadass ............. 707/102 |
| 2005/0005200 A1 * | 1/2005 | Matena et al. ............. 714/38 |
| 2005/0050337 A1 * | 3/2005 | Liang et al. ............. 713/188 |
| 2005/0283764 A1 * | 12/2005 | Chiu ............. 717/125 |
| 2006/0080656 A1 * | 4/2006 | Cain et al. ............. 717/174 |

OTHER PUBLICATIONS

McCarthy et al., Algorithm for Automated Enterprise Deployments.

* cited by examiner

*Primary Examiner*—Cam Y T Truong
(74) *Attorney, Agent, or Firm*—Stephen A. Calogero, Esq.; Steven M. Greenberg, Esq.

(57) ABSTRACT

A method of deploying enterprise applications or updates to data processing systems in a complex data processing environment. The enterprise applications or updates are phase deployed to the target data processing systems. Phased deployment includes the steps of preparing one affected node, quiescing all affected servers in the node, stopping all affected servers in the node, synchronizing the node, delivering the applications or updates, starting all affected servers, reactivating all affected servers, restoring the affected node, and repeating these steps for each affected node one at a time until all targeted data processing systems have been affected.

8 Claims, 4 Drawing Sheets

ALGORITHM FOR MAXIMIZING APPLICATION AVAILABILITY DURING AUTOMATED ENTERPRISE DEPLOYMENTS

CROSS REFERENCE TO RELATED APPLICATION

The present invention is related to the following application entitled Algorithm for Automated Enterprise Deployments, Ser. No. 11/003,902 filed on Dec. 3, 2004.

BACKGROUND OF THE INVENTION

1. Technical Field

The present invention is related generally to a data processing system and in particular to a method and apparatus for processing data. Still more particularly, the present invention relates to a method, apparatus, and computer instructions for maximizing application availability while automatically deploying enterprise applications or updates in complex data processing environments.

2. Description of Related Art

Modern data processing environments can be extremely complex. A data processing environment may have a vast number of data processing systems connected to each other in a web of physical groupings known as nodes and logical groupings known as clusters. A node is a control mechanism for one or more servers on a machine. A cluster logically deals with multiple similar servers on different machines. Clusters can coexist with other non-cluster servers on a machine and may contain all of the same applications.

Due to the nature of the organization of inter-dependent applications throughout the set of data processing systems, affecting one data processing system in a node or cluster may affect other applications on other data processing systems in the data processing environment. If at least one copy of each application does not remain running somewhere in the data processing environment, then service may be denied and an availability failure may occur. Moreover, one running copy of every application may not be sufficient to maintain service. Multiple running copies of software may be required to achieve acceptable throughput and response service levels.

The complexity of modern data processing environments makes deploying new enterprise applications (EARs), or other applications, onto data processing systems difficult. The problem is especially complex if updated enterprise applications are deployed. If even one data processing system requires an enterprise application update to be deployed, then many other data processing systems can be affected.

Automated programs for deploying enterprise applications that are available today require voluminous code that is very expensive to design, develop, debug, and maintain. Such programs are hard-coded to particular sets of enterprise applications and particular environments. Such unique code is not transferable to other organizations, is not supportable, and is not flexible enough to adapt to new applications or new environments.

BRIEF SUMMARY OF THE INVENTION

The present invention provides a method for automating the deployment of a number of enterprise applications and enterprise application updates on one or more computer data processing systems operating in a data processing environment. When automated enterprise deployment is invoked, computer instructions in a computer readable medium provide for initializing, performing, and finalizing deployment of the enterprise applications. During initialization, a number of enterprise applications are selected to be deployed on target data processing systems. During deployment, the enterprise applications are phase deployed to the target data processing systems. Phased deployment includes the steps of optionally quiescing all affected servers in one affected node, stopping all affected servers in the node, synchronizing the node, delivering an application or update, restarting all affected servers, reactivating the affected servers if quiesced, and then repeating these steps for each affected node one at a time until all data processing systems have been affected. During the updating process, each affected server is updated one time, regardless of the number of updates, and all other unaffected servers in that node remain operational in order to run applications. Similarly, unaffected nodes and all their servers remain operational throughout the update process. During the finalization of deployment, the deployment of each enterprise application is validated. Upon successful deployment, deployed enterprise applications are moved from a distribution directory into a released directory for audit purposes or for future rollback and recovery use.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
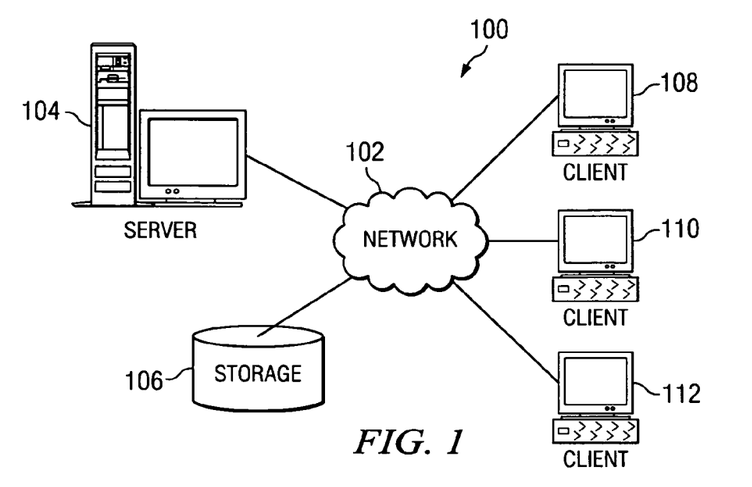
FIG. 1 is a pictorial representation of a network data processing system in which the present invention may be implemented.

With reference now to the figures and in particular with reference to FIG. 1, a pictorial representation of a network data processing system in which the present invention may be implemented is depicted. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
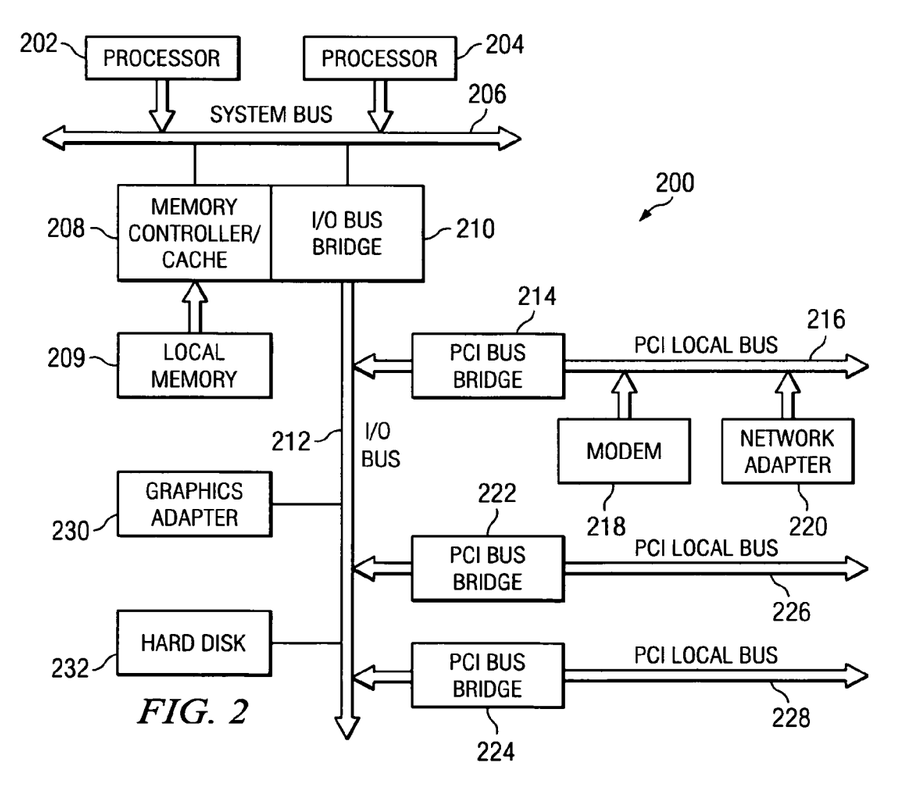
FIG. 2 is a block diagram of a data processing system that may be implemented as a server in accordance with an aspect of the present invention.

FIG. 2 is a block diagram of a data processing system that may be implemented as a server, such as server 104 of FIG. 1, in accordance with an aspect of the present invention. Data processing system 200 may be a symmetric multiprocessor (SMP) system including a number of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM® eServer™ pSeries® computer system, running the Advanced Interactive Executive (AIX®) operating system or LINUX operating system (IBM, eServer, pSeries and AIX are trademarks of International Business Machines Corporation in the United States, other countries, or both while Linux is a trademark of Linus Torvalds in the United States, other countries, or both).

Figure 3:
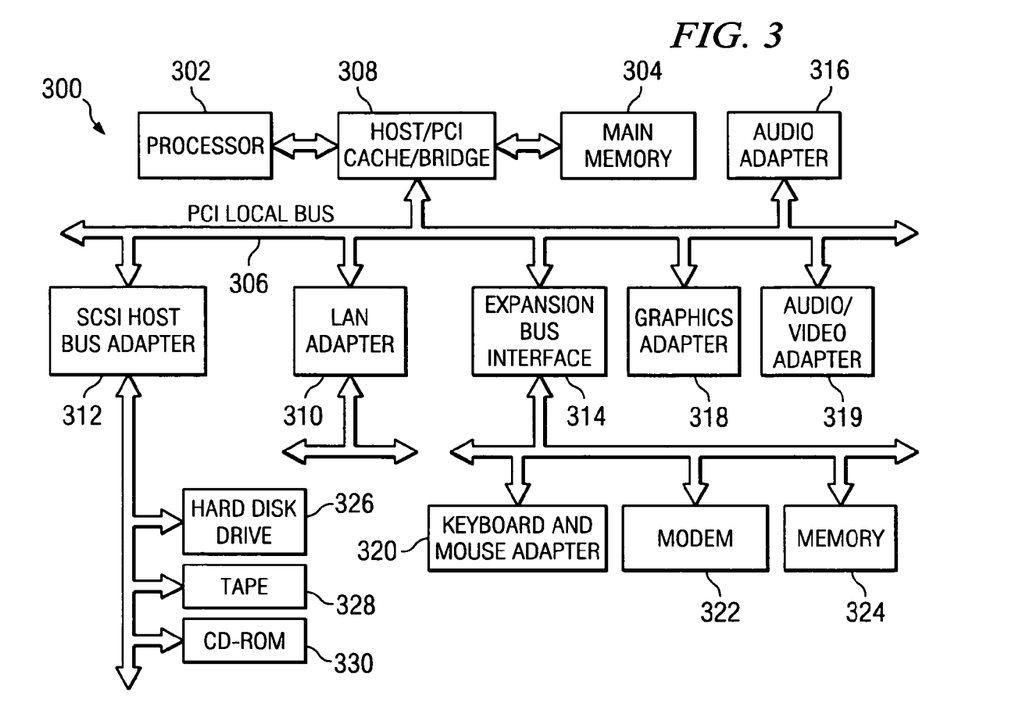
FIG. 3 is a block diagram illustrating a data processing system in which the present invention may be implemented.

FIG. 3 is a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Microsoft® Windows® XP (Microsoft and Windows are trademarks of Microsoft Corporation in the United States, other countries, or both). An object oriented programming system such as Java™ may run in conjunction with the operating system and provide calls to the operating system from Java programs or programs executing on data processing system 300 (Java is a trademark of Sun Microsystems, Inc. in the United States, other countries, or both) Instructions for the operating system, the object-oriented programming system, and programs or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. In addition, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

In a complex data processing environment, many data processing systems are arranged into nodes and clusters, and each data processing system supports or runs a number of applications. These applications, and in particular enterprise applications, are installed and updated on the data processing systems and their application server programming systems. However, when an application is installed or updated, that application is not available for service unless that application is also replicated and running on other data processing systems. If one application is not available for service, then often other inter-dependent applications may also fail to provide service. It is very inefficient to disable many or all data processing systems to deploy applications or application updates. However, it is very difficult to update individual data processing systems without disabling many data processing systems in the environment, due to the complexity of the operating environment and due to inter-dependencies between all the enterprise applications.

The present invention provides a method, apparatus, and computer program product for automating the deployment of a number of enterprise applications and enterprise application updates on one or more computer data processing systems operating in a data processing environment. In the illustrative examples, deploying an enterprise application means taking steps such as, for example, installing the enterprise application, updating an existing enterprise application, reconfiguring an existing enterprise application, or deleting an existing enterprise application. The most difficult deployment operation is updating existing enterprise applications in a manner which maintains maximum application availability throughout the enterprise.

When automated enterprise deployment is invoked, computer instructions in a computer readable medium provide for initializing, performing, and finalizing deployment of the enterprise applications. During initialization, a number of enterprise applications or enterprise application updates are selected to be deployed on target data processing systems. The selected enterprise applications are read and installed in a distribution repository and their configuration settings and targets are set. During deployment, the enterprise applications are phase deployed to the target data processing systems. Phased deployment includes the steps of optionally quiescing all affected servers in one affected node, stopping all affected servers in the node, synchronizing the node, delivering an application or update, restarting all affected servers, reactivating the affected servers if quiesced, and then repeating these steps for each affected node one at a time until all data processing systems have been affected. During the updating process, each affected server is updated one time, regardless of the number of updates, and all other unaffected servers in that node remain operational in order to run applications. Similarly, unaffected nodes and all their servers remain operational throughout the update process. During the finalization of deployment, the deployment of each enterprise application is validated. Upon successful deployment, deployed enterprise applications are moved from the distribution directory into a released directory for audit purposes or for future rollback and recovery use.

Figure 4:
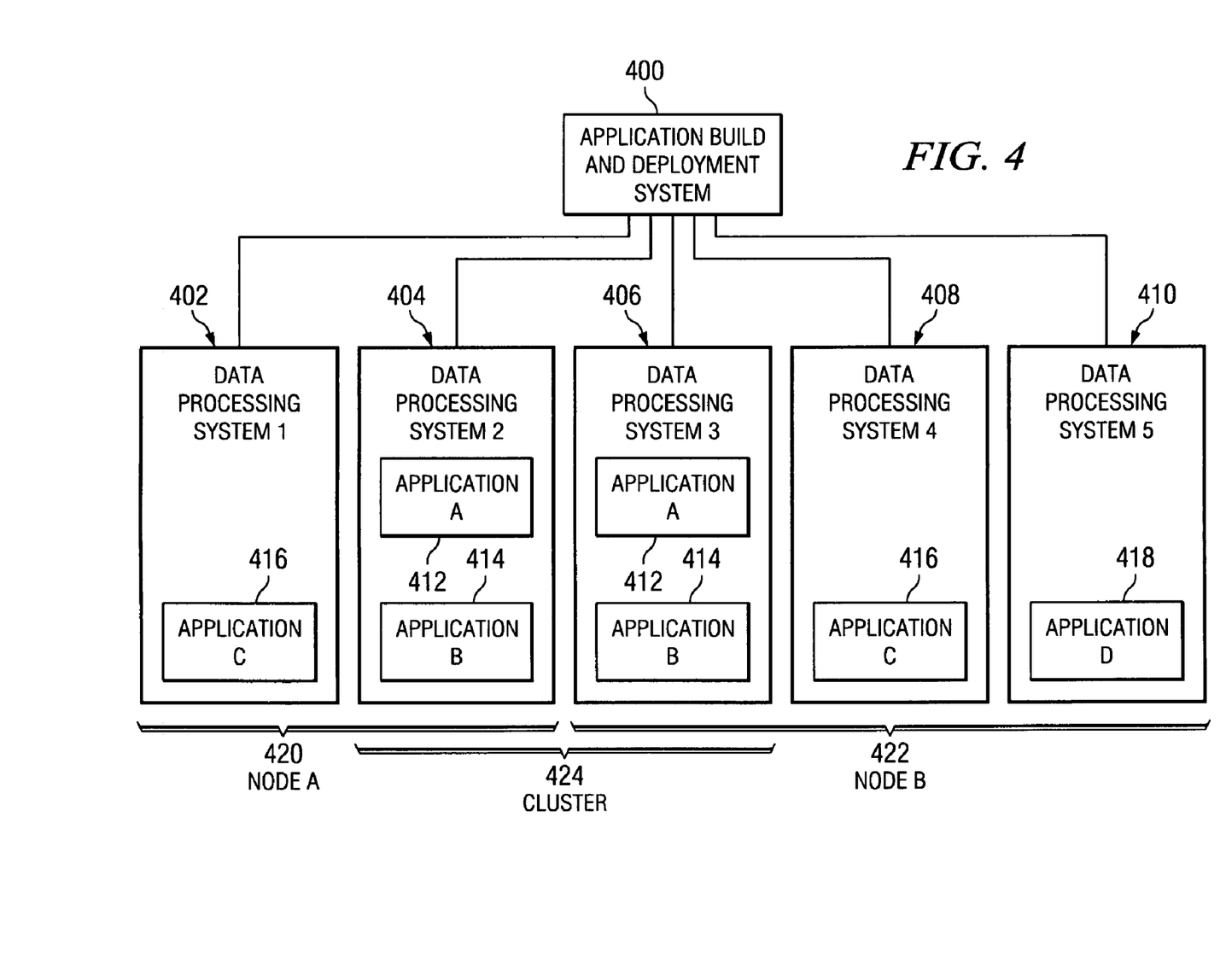
FIG. 4 is a block diagram illustrating an environment in which the present invention may be implemented.

FIG. 4 shows an illustrative environment wherein a deployment system 400 installs and maintains applications on five data processing systems, 402, 404, 406, 408, and 410 connected via a network, such as an intranet or the Internet. Each data processing system may be a build and deployment server on a server such as server 104 of FIG. 1, a client computer, such as clients 108, 110, and 112, or a stand-alone computer. Typically, the data processing environment is a collection of servers that do not use the server-client structure. The deployment system 400 need not be a separate data processing system, but may be one of the affected data processing systems, 402, 404, 406, 408, and 410. The deployment system may also be computer instructions contained in a computer readable medium for carrying out the deployment of enterprise applications. In addition, multiple deployment systems may be implemented.

In any case, each data processing system executes a number of applications. Data processing system 1 402 executes application C 416. Data processing system 2 404 executes application A 412 and application B 414. Data processing system 3 406 is a redundant logical cluster member on a different physical node which also executes applications A 412 and application B 414. Data processing system 4 executes redundant application C 416. Data processing system 4 is similar to data processing system 1, but these two systems have not been logically grouped together as a cluster. Data processing system 410 executes non-redundant application D 418. Data processing systems 402 and 404 are physically grouped into Node A 420. Data processing systems 406, 408, and 410 are physically grouped into Node B 422. Data processing systems 404 and 406 are logically grouped into cluster 424.

FIG. 4 shows four applications executed on five data processing systems physically grouped into two nodes. Two data processing systems are logically grouped into one cluster. However, actual data processing environments may contain hundreds or even thousands of data processing systems executing a vast array of applications. Similarly, the data processing systems may be grouped into a great number of nodes and clusters.

FIG. 4 illustrates that one application may be executed on data processing systems grouped in different nodes and clusters. For example, application A 412 runs on data processing systems 404, and 406, across node A 420 and node B 422, and within cluster 424. Because of the complexity of this arrangement, if an update to application A is to be simultaneously deployed to data processing systems 404 and 406, then all five data processing systems, 402, 404, 406, 408, and 410 may be affected if either of the other applications C 416 or D 418 depend on the affected application A 412.

In another example, if application A 412 is affected and first updated only on data processing system 404, then in order to quiesce work to application A 412 the entire data processing system 404 must be stopped prior to its application update. Thus, application B 414 will also be unavailable in data processing system 404, even if that application B 414 is not directly dependent on application A 412. Maintaining complete redundant copies of all applications within different clusters members helps to avoid such associated application failures. However, in many data processing environments, clusters might not be used or there may be one or more unique applications in certain cluster members. In addition, many enterprise systems may have a combination of non-clustered applications spread over different sets of nodes and servers due to a number of reasons, including security, corporate organization, or geographic location.

Figure 5:
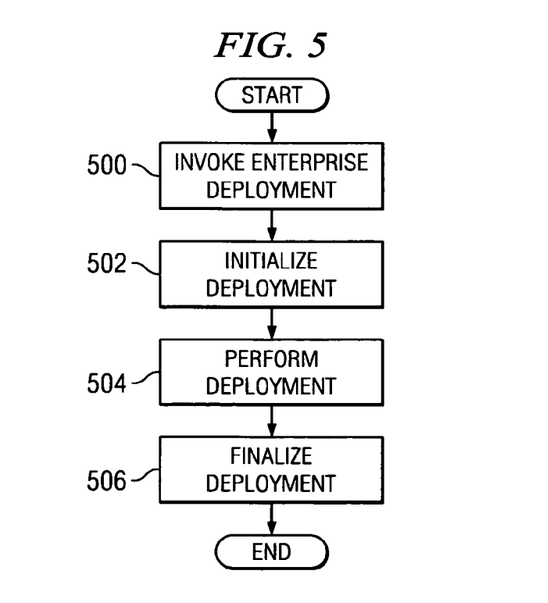
FIG. 5 is a flowchart illustrating the automatic deployment of enterprise applications in the operating environment of FIG. 4, in accordance with an aspect of the present invention.

FIG. 5 is a flowchart illustrating the automatic deployment of enterprise applications or updates in the operating environment of FIG. 4, in accordance with an aspect of the present invention. Although the process of deploying enterprise applications or updates is described in the context of deploying enterprise applications, the process may be used to deploy any application in a data processing environment. An algorithm for deploying enterprise applications or updates is shown in an application entitled, "Algorithm for Automated Enterprise Deployments," attorney docket number CA920040134US1, U.S. application Ser. No.11/003,902, filed Dec. 3, 2004, which is hereby incorporated by reference.

The process begins with a command to invoke the deployment of enterprise applications (step 500). The command to invoke deployment may come from input provided by a user, in which case the invocation is a manual invocation. The command to invoke deployment may come from input provided by an automatic process such as another computer program, in which case the invocation is an automatic invocation. In an illustrative embodiment, automatic invocation is performed on a regular basis, such as daily or weekly time periods. In this case, a program automatically invokes the deployment of enterprise applications once during each time period. However, a program may automatically invoke the deployment of enterprise applications based on other conditions, such as the failure of one or more applications, the failure of one or more data processing systems in the environment, the availability of new or updated applications, and the like.

Next, the deployment system, such as deployment system 400 of FIG. 4, initializes a set of enterprise applications to be deployed onto a set of data processing systems (step 502). During initialization, a subset of enterprise applications may be selected, based on identifying indicia or other indicia, from the set of enterprise applications in the dynamic distribution directory. The deployment system then pre-validates the deployment of the subset of enterprise applications to ensure that the deployment of the subset of enterprise applications has an acceptable chance to succeed.

Next, a deployment system, such as deployment system 400 of FIG. 4, actually deploys the subset of enterprise applications or updates to the data processing systems, such as data processing systems 402, 404, 406, 408, and 410 of FIG. 4 (step 504). The term "deploying an enterprise application" may refer to both deploying a new enterprise application and updating an existing enterprise application. As described further in relation to FIG. 7 and FIG. 8, only a minimum number of data processing systems are stopped while performing updates. Deploying an enterprise application may involve installing a new enterprise application, updating a previous version of an installed enterprise application, reconfiguring or otherwise maintaining a previously installed enterprise application, or uninstalling a previously installed enterprise application.

After deploying the subset of enterprise applications to the data processing systems, the deployment system validates the deployment (step 506). The deployment of each enterprise application is verified. If the deployment was successful, then that application is moved from the distribution directory into the released directory. The application is also versioned with the current date and time. If the deployment was not successful, then that application is moved from the distribution directory into the failed directory.

Figure 6:
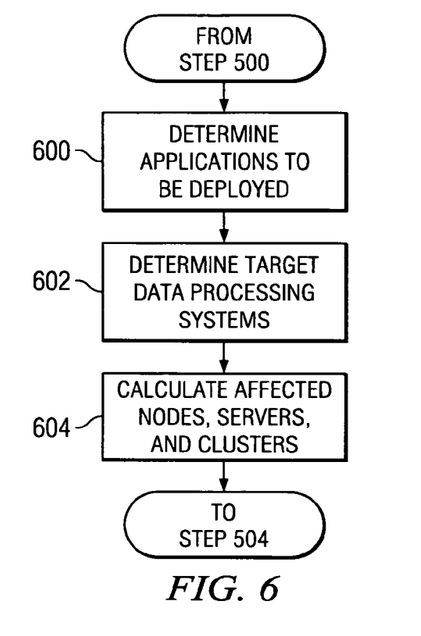
FIG. 6 is a flowchart illustrating steps taken during the initialize deployment step of FIG. 5, in accordance with an aspect of the present invention.

FIG. 6 is a flowchart illustrating steps taken during the initialize deployment step 500 of FIG. 5, in accordance with an aspect of the present invention. First, the deployment system, such as deployment system 400 in FIG. 4, determines which enterprise applications will be deployed to a set of data processing systems (step 600). Many enterprise applications may need to be deployed across one or more data processing systems, though not all data processing systems necessarily will have the same enterprise application deployed.

After determining which enterprise applications will be deployed, the deployment system determines upon which data processing systems an enterprise application will be deployed (step 602). If an enterprise application is to be deployed onto a data processing system, that data processing system is an affected data processing system. For example, in the data processing environment shown in FIG. 4, applications B and C need to be updated and each requires that an enterprise application update be deployed on each data processing system supporting applications B and C. In this case, data processing systems 402, 404, 406, and 408 support applications B or C. Thus, enterprise applications will be deployed to those four data processing systems, meaning that data processing systems 402, 404, 406, and 408 are affected data processing systems.

After determining which data processing systems are affected, the deployment system calculates the nodes and clusters that are affected by the planned deployment of enterprise applications (step 604). If a data processing system in a node or a cluster is affected by a deployment, then the entire node or cluster is also affected. Continuing the illustrative example, the affected nodes are node A 420 and node B 422. Both nodes are affected because data processing systems 402 and 404 are in node A 420 and data processing systems 406 and 408 are in node B 422. The cluster is affected because both data processing system 404 and data processing system 406 are affected.

A more detailed process for initializing the deployment (step 502) is shown in an application entitled, "Algorithm for Automated Enterprise Deployments," attorney docket number CA920040134US1, U.S. application Ser. No. 11/003, 902, filed Dec. 3, 2004, which is hereby incorporated by reference. However the initialization step is performed, the deployment system proceeds to step 504, of FIG. 5, in which deployment of the enterprise applications is performed.

Figure 7:
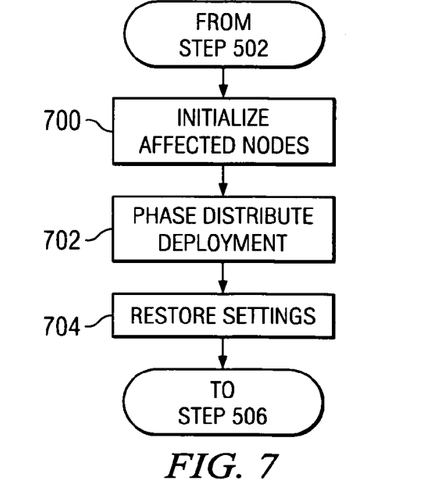
FIG. 7 is a flowchart illustrating steps taken during the perform deployment step of FIG. 5, in accordance with an aspect of the present invention.

FIG. 7 is a flowchart illustrating steps taken during the perform deployment step 504 of FIG. 5, in accordance with an aspect of the present invention. The process of deploying the enterprise applications begins with initializing all affected nodes (step 700). By initializing affected nodes, the deployment system prepares each node for the deployment of enterprise applications on each data processing system within the node. In one example, initializing a node involves saving information contained in the node and disabling any automatic application updates that might affect that node.

Thereafter, the enterprise applications are phase distributed to all data processing systems in all nodes (step 702). To phase distribute the deployment of enterprise applications, deployment is executed on one node at a time. Within the node, deployment is executed on all affected processing systems at the same time. The process of phase distributing the deployment of enterprise applications is illustrated in more detail in FIG. 8. After all enterprise applications have been deployed to the affected data processing systems, settings are restored in all affected nodes (step 704). For example, the automatic synchronization function of some applications may be restored to synchronize nodes automatically. Thereafter, the process proceeds to the validation step (506) of FIG. 5.

Figure 8:
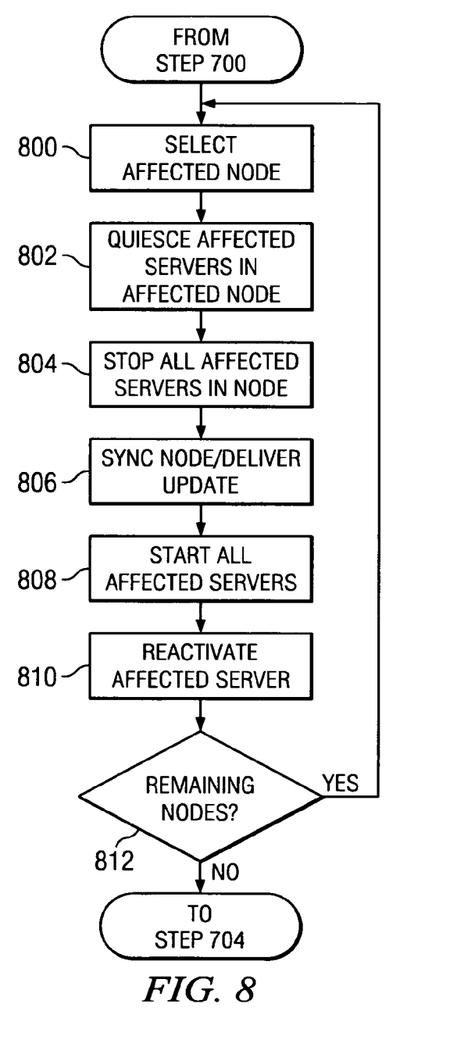
FIG. 8 is a flowchart illustrating steps taken during the phased distribute deployment step of FIG. 7, in accordance with an aspect of the present invention.

FIG. 8 is a flowchart illustrating steps taken during the phase distribute deployment step (702) of FIG. 7, in accordance with an aspect of the present invention. In the illustrative example of FIG. 8, the deployment system first determines which data processing systems are affected by the deployment, as well as which nodes and clusters are affected by the deployment (previous step 604).

Next, one affected node is selected (step 800) and all its affected servers are optionally quiesced (step 802). Quiescing a server involves preventing a server from receiving more work, though quiesced data processing systems within the node remain temporarily active and can complete currently pending tasks. Using the previous example of updating applications B and C in the data processing environment of FIG. 4, when those applications are deployed to node B 422, then data processing systems 406 and 408 are optionally quiesced. Accordingly, data processing systems 406, and 408, temporarily continue performing in-progress work to allow those data processing system to complete any pending tasks. However, unaffected data processing system 410 remains fully active and keeps processing all ongoing and new requests.

Subsequently, all affected data processing systems in the node are stopped (step 804). In the illustrative example shown above, data processing systems 406, and 408, are stopped. Stopping application servers allows any non-quiesced work requests to failover-recover to other redundant applications running on active servers. Next, a sync node command is issued to the affected node so that all data processing systems in the node are synchronized and the updates are simultaneously deployed to all affected data processing systems (step 806) in the node.

In addition, a configuration script may optionally be provided with the enterprise application to configure external resources required by a deployed enterprise application at this time. The configuration script could perform configuration actions relating to the operating system, such as to copy files, create or clean directories, and to perform other functions related to other programs, such as creating message queuing tables or JDBC data sources. Such actions may extend beyond the affected data processing systems. Other activities and checks also may be performed on the affected data processing systems at this time.

In the illustrated example, application B 414 on data processing system 406 and application C 416 on data processing system 408 are updated. Data processing system 410 is unaffected and continues to perform tasks while data processing systems 406 and 408 are stopped. Enterprise application updates are deployed to all affected data processing system in a node simultaneously.

After all enterprise applications have been deployed, the deployment system starts all affected data processing systems (step 808), if the data processing systems had been stopped. Thereafter, the affected servers are reactivated (step 810). Reactivating a server means that the server will accept and process work requests for its applications. In the illustrative example, data processing systems 406 and 408 are started and reactivated.

After reactivating all servers on the affected node, the deployment system determines whether any other affected nodes remain (step 812). If affected nodes remain, then the process returns to step 800 in order to process the next affected node. If no affected nodes remain, then the process proceeds to finalize deployment (step 506 of FIG. 5). In the illustrated example, Application B 414 is deployed to data processing systems 406 and 408 on node A 420. Thereafter, the process continues to finalize deployment.

In another example related to the environment shown in FIG. 4, applications A 412 and B 414 require maintenance. To perform the required maintenance, enterprise application updates are deployed to all affected data processing systems.

Here, the affected data processing systems are data processing systems 404, and 406. Both node A 420 and node B 422 are affected, and cluster 424 is affected as well. To deploy the enterprise applications, first node A 420 is prepared. Subsequently, data processing system 402 is optionally quiesced and then stopped. Node A 420 is synchronized and all enterprise application updates are deployed to data processing system 402. Thereafter, data processing system 402 is started and then, if quiesced, is reactivated. Next, node A 420 settings are restored.

Continuing the illustrative example, node B 422 is prepared after node A 420 is restored. Data processing system 406 is affected, so that data processing system is optionally quiesced and then stopped. Data processing systems 408 and 410 remain active. Thereafter, node B 422 is synchronized and both enterprise application updates are deployed to data processing system 406. Next, data processing systems 406 is started and then, if quiesced, is reactivated and, subsequently, node B is restored.

The above illustrative examples demonstrate a method of minimizing the down time of each affected data processing system in a complex data processing environment. To the extent possible, each data processing system is affected one at a time to maximize the resources available to the data processing environment. When multiple data processing systems must be stopped simultaneously due to node or cluster restrictions, all deployments are conducted on all affected data processing systems at the same time. However, each affected node is processed one node at a time, and only the affected servers within an affected node are stopped. Thus, application resources available to the data processing environment are increased.

In the illustrative examples of FIG. 8, the entire process is performed automatically. However, the process may also allow manual confirmations. In this case, the deployment system will deploy an enterprise application to one data processing system, validate the deployment, and then pause. The deployment system then displays the result to the user. The deployment system then prompts the user for input as to whether to proceed with installing an enterprise application on the next server, to reverse the deployment, or to terminate the entire process. The deployment system repeats this process for every data processing system affected by an enterprise application deployment. Typically, the default response at each stage is to proceed with deployment of the next system. On the other hand, the default response may be to suspend deployment of enterprise applications or to stop the process altogether.

In order to increase the resources available to the data processing environment, the deployment system can re-route tasks performed by affected data processing to unaffected data processing systems within affected or unaffected nodes. In addition, the action of quiescing a server and later reactivating it is optional. As long as the server is stopped prior to updating its application, failover-recovery will route new work requests to redundant applications on active servers, and only some in-progress work requests might fail. However, by first quiescing the server work and allowing in-progress work to be completed, the highest levels of application availability can be achieved.

Thus, the present invention provides a method, apparatus and computer program product for automating the deployment of a number of enterprise applications or updates on one or more computer data processing systems operating in a data processing environment. When automated enterprise deployment is invoked, computer instructions in a computer readable medium provide for initializing, performing, and finalizing deployment of the enterprise applications. During initialization, a number of enterprise applications or updates are selected to be deployed on target data processing systems. During deployment, the enterprise applications are phase deployed to the target data processing systems. Phased deployment includes the steps of preparing one affected node, optionally quiescing and then stopping all affected servers in the node, synchronizing the node, delivering the update, starting and then (if quiesced) reactivating all affected servers, restoring the affected node, and then repeating these steps for each affected node one at a time until all data processing systems have been affected. During the finalization of deployment, the deployment of each enterprise application is validated. Upon successful deployment, deployed enterprise applications are moved from a distribution directory into a released directory for audit purposes or for future rollback and recovery use.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of deploying an enterprise application on a set of data processing systems operating in a data processing environment having a first node and a second node, the method comprising:

determining whether the first node is affected, wherein the first node is affected if the enterprise application is deployed on at least one data processing system in the first node;

determining whether the second node is affected, wherein the second node is affected if the enterprise application is deployed on at least one data processing system in the second node;

if the first node is affected: quiescing each affected server on the first node before stopping said each affected server on the first node, and reactivating said each affected server on the first node after starting said each affected server on the first node, post-validating the deployment of the enterprise application on each affected data processing system in the first node after starting said each affected data processing system in the first node;

preparing the first node; stopping said each affected data processing system in the first node, wherein said each affected data processing system in the first node is a data processing system to which the enterprise application is deployed;

deploying the enterprise application on said each affected data processing system in the first node; thereafter starting said each affected data processing system in the first node; restoring the first node;

if the second is affected, preparing the second node by stopping each affected data processing system in the second node, wherein an affected data processing system is a data processing system to which an enterprise application is deployed; deploying the enterprise application on said each affected data processing system in the second node; thereafter starting said each affected data processing system in the second node; restoring the second node; wherein at least one of the first node and the second node is affected.

2. The method of claim 1 further comprising: if the second node is affected, quiescing each affected server on the second node before stopping each affected server on the second node, and reactivating each affected server on the second node after staring each affected server on the second node.

3. The method of claim 1 wherein the first node is affected and the second node is affected.

4. The method of claim 1 wherein:
the first node affected; and
with respect to the first node, stopping each data processing system, deploying the enterprise application on each data processing system, and starting each affected data processing system are performed sequentially upon one affected data processing systerm at a time until the enterprise application has been deployed on all affected data processing systerms in the first node.

5. The method of claim 1 wherein:
the first is affected; and
with respect to the first node, stopping each data processing system, deploying the enterprise application on each data processing system, and starting each affected data processing system are performed on all affected data processing systems simultaneously.

6. The method of claim 1 further comprising:
executing a synchronize node command after stopping each data processing system in the first node; and
executing a synchronize node command after stopping each data processing system in the second node.

7. The method of claim 1 further comprising:
if the first node is affected, then prior to preparing the first node performin pre-validating the deployment of the enterprise application to the affected data processing systems in the first node; and
if the second node is affected, then prior to preparing the second node performing pre-validating the deployment of the enterprise application to the affected data processing systems in the second node.

8. The method of claim 1 further comprising:
if the second node is affected, post-validating the deployment of the enterprise application on each affected data processing system in the second node after starting each affected data processign system in the second node.

* * * * *